US011930119B2

(12) United States Patent
Johnson et al.

(10) Patent No.: US 11,930,119 B2
(45) Date of Patent: *Mar. 12, 2024

(54) SYSTEMS AND METHODS FOR PAYMENT AUTHENTICATION

(71) Applicant: Capital One Services, LLC, McLean, VA (US)

(72) Inventors: Clayton Johnson, Edgewood, MD (US); Esther Scott, Arlington, VA (US); Jeffrey Wieker, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,561

(22) Filed: Nov. 15, 2022

(65) Prior Publication Data

US 2023/0078140 A1 Mar. 16, 2023

Related U.S. Application Data

(63) Continuation of application No. 16/900,118, filed on Jun. 12, 2020, now Pat. No. 11,601,279.

(51) Int. Cl.
*H04L 9/32* (2006.01)
*G06Q 20/38* (2012.01)
(Continued)

(52) U.S. Cl.
CPC ......... *H04L 9/3231* (2013.01); *G06Q 20/382* (2013.01); *G06Q 20/4014* (2013.01); *H04L 9/0866* (2013.01); *H04L 9/3213* (2013.01)

(58) Field of Classification Search
CPC ... H04L 9/3231; H04L 9/0866; H04L 9/3213; G06Q 20/382; G06Q 20/4014
(Continued)

(56) References Cited

U.S. PATENT DOCUMENTS 7,539,644 B2 * 5/2009 Hu ..................... G06Q 20/4016
705/64
7,606,770 B2 * 10/2009 Pinnell .................. G06Q 20/28
705/40
(Continued)

FOREIGN PATENT DOCUMENTS

CN 105359179 A 2/2016
CN 106464492 A 2/2017
(Continued)

OTHER PUBLICATIONS

Notification of Transmittal of the International Search Report and The Written Opinion of the International Searching Authority dated Sep. 30, 2021 in International Application No. PCT/US2021/036950 (11 pages).

*Primary Examiner* — Thanh T Le
(74) *Attorney, Agent, or Firm* — Bookoff McAndrews, PLLC

(57) ABSTRACT

Methods and systems are disclosed for payment authentication. For example, a method may include: the method comprising: storing a first device fingerprint in association with a token representing a primary account number, the first device fingerprint being derived from a device attribute of a user device and behavioral biometric data derived from a behavioral pattern of a user in using the user device; receiving an authentication request indicative of the token and a second device fingerprint generated by a customer device associated with a customer of a merchant, the authentication request being associated with a transaction between the merchant and a customer using the token; identifying the stored first device fingerprint based on the token indicated by the authentication request; and determining whether the second device fingerprint matches the stored first device fingerprint.

20 Claims, 5 Drawing Sheets

(51) Int. Cl.
  *G06Q 20/40* (2012.01)
  *H04L 9/08* (2006.01)
(58) Field of Classification Search
  USPC .......................................................... 713/186
  See application file for complete search history.

(56) References Cited

U.S. PATENT DOCUMENTS

| | | | | |
|---|---|---|---|---|
| 8,341,421 | B1* | 12/2012 | Robinson | G06Q 20/3678 726/4 |
| 8,930,274 | B1* | 1/2015 | Brickell | G06Q 20/40 705/67 |
| 9,578,505 | B2 | 2/2017 | Buhler et al. | |
| 2005/0165684 | A1* | 7/2005 | Jensen | G06Q 20/425 705/44 |
| 2006/0095369 | A1* | 5/2006 | Hofi | G06Q 20/40145 705/76 |
| 2010/0115610 | A1* | 5/2010 | Tredoux | G06F 21/316 726/19 |
| 2011/0231911 | A1 | 9/2011 | White et al. | |
| 2015/0142623 | A1 | 5/2015 | Ferguson et al. | |
| 2015/0278805 | A1 | 10/2015 | Spencer, III et al. | |
| 2016/0197917 | A1* | 7/2016 | Lee | H04L 63/0861 726/7 |
| 2017/0039568 | A1* | 2/2017 | Tunnell | G06F 21/33 |
| 2017/0140347 | A1 | 5/2017 | Berman et al. | |
| 2017/0178093 | A1 | 6/2017 | Bull et al. | |
| 2017/0264599 | A1 | 9/2017 | O'Regan et al. | |
| 2017/0331828 | A1 | 11/2017 | Caldera et al. | |
| 2018/0026973 | A1 | 1/2018 | Le Saint et al. | |
| 2018/0218135 | A1 | 8/2018 | Cho et al. | |
| 2018/0268407 | A1* | 9/2018 | Voldman | H04L 9/3228 |
| 2018/0268414 | A1 | 9/2018 | Chung et al. | |
| 2018/0351943 | A1* | 12/2018 | Yasukawa | G06F 21/33 |
| 2019/0141026 | A1* | 5/2019 | Kshirsagar | H04L 63/123 |
| 2020/0005295 | A1* | 1/2020 | Murphy | G06Q 20/405 |
| 2020/0126085 | A1 | 4/2020 | Roche et al. | |
| 2020/0259638 | A1* | 8/2020 | Carmignani | H04L 9/50 |
| 2021/0174355 | A1 | 6/2021 | Gupta et al. | |
| 2021/0327547 | A1* | 10/2021 | Praszczalek | G16H 10/60 |
| 2022/0148000 | A1* | 5/2022 | Mimassi | G16H 20/60 |

FOREIGN PATENT DOCUMENTS

| | | |
|---|---|---|
| CN | 109328445 A | 2/2019 |
| CN | 110100258 A | 8/2019 |

* cited by examiner

SYSTEMS AND METHODS FOR PAYMENT AUTHENTICATION

CROSS-REFERENCE TO RELATED APPLICATION(S)

This patent application is a continuation of, and claims the benefit of priority to, U.S. Nonprovisional patent application Ser. No. 16/900,118, filed on Jun. 12, 2020, the entirety of which is incorporated herein by reference.

TECHNICAL FIELD

Various embodiments of the present disclosure relate generally to payment authentication technology and, more particularly, to authentication of tokenized payments using device fingerprints.

BACKGROUND

A customer may desire the ability to make payments from a credit card account or other financial account without exposing the account number. Tokens, such as a virtual card numbers, may be used to represent the account without exposing the account number. However, there may be a concern of fraudulent usage of the token by unauthorized parties. Therefore, there is a need for systems and methods for authenticating payments made using tokens. Such authentication may include, for example, verification that the token was provided by an authorized party.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for payment authentication.

For example, a computer-implemented method may include: storing a first device fingerprint in association with a token representing a primary account number, the first device fingerprint being derived from a device attribute of a user device and behavioral biometric data derived from a behavioral pattern of a user in using the user device; receiving an authentication request indicative of the token and a second device fingerprint generated by a customer device associated with a customer of a merchant, the authentication request being associated with a transaction between the merchant and a customer using the token; identifying the stored first device fingerprint based on the token indicated by the authentication request; determining whether one or more conditions for authentication are satisfied, the one or more conditions including a match between the second device fingerprint and the stored first device fingerprint; and upon determining that the one or more conditions for authentication are satisfied, generating an authentication message indicating that the transaction has been authenticated.

Furthermore, a computer system for payment authentication may include a memory storing instructions and one or more processors configured to execute the instructions to perform operations. The operations may include: receiving, from a user device associated with a user, a request to associate a first device fingerprint with a token representing a primary account number and with a specified merchant to which usage of the token is to be limited, the first device fingerprint having been generated by the user device and being derived from a device attribute of the user device and behavioral biometric data derived from a behavioral pattern of the user in using the user device; receiving a transaction authorization request associated with a transaction between a merchant and a customer using the token, the transaction authorization request being derived from the token and a second device fingerprint generated by the customer device; determining whether conditions for authentication are satisfied, the conditions including a match between the second device fingerprint and the first device fingerprint, and a match between the specified merchant and the merchant; and upon determining that the conditions for authentication are satisfied, generating an authentication message indicating that the transaction has been authenticated.

Furthermore, a non-transitory computer-readable medium may store instructions that, when executed by one or more processors of a user device, cause the one or more processors to perform operations for providing data for payment authentication. The operations may include: detecting a user operation identifying a token for submission to a merchant system via an electronic commerce application, the token representing a primary account number, the token being usable for making a payment to the merchant; generating a device fingerprint based on a device attribute of the user device and behavioral biometric data, the device attribute including a unique hardware identifier of a hardware component of the user device, the behavioral biometric data being derived from a behavioral pattern of a user in using the user device; and transmitting, to the merchant system, the generated device fingerprint and the token so that the token is used to make the payment.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, a user device may generate a device fingerprint and provide the device fingerprint when requesting a token from a payment authentication system of financial services provider. The payment authentication system may then store the device fingerprint in association with a token, to the effect that the token may be used for payment only if the payment is made by a device that can generate a matching device fingerprint. When the token is later used by the user device for an electronic payment, such as a payment made on a website of a merchant, the user device may regenerate the device fingerprint and transmit it to the payment authentication system along with the token. If this device fingerprint matches the earlier-stored device fingerprint, the financial services provider which may then verify that the token was transmitted from a user device that has permission to user the token. In this disclosure, a payment made using a token may also be referred to as a tokenized payment.

Figure 1:
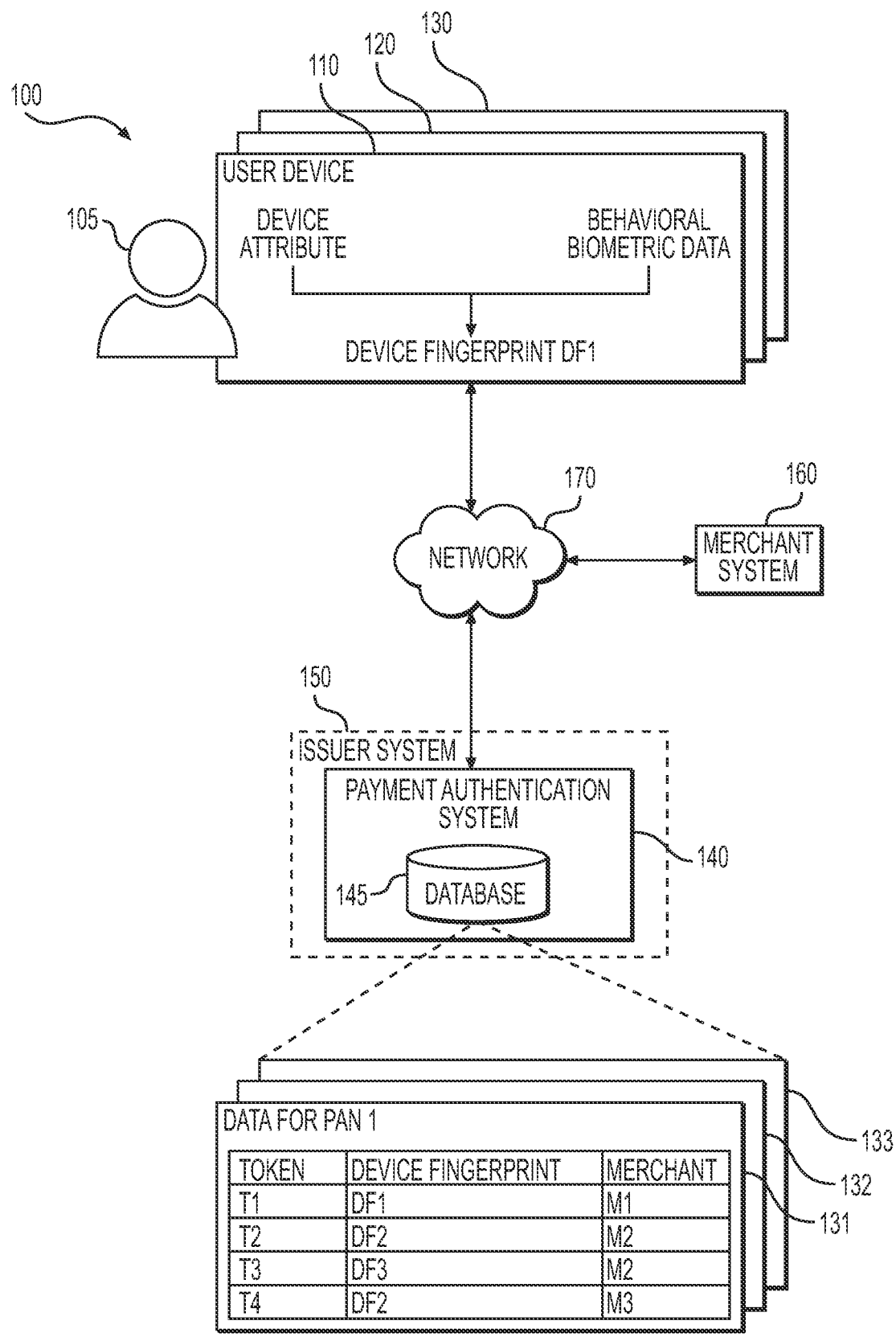
FIG. 1 depicts an exemplary system environment for payment authentication, according to one or more embodiments.

FIG. 1 depicts a system environment 100 for payment authentication. System environment 100 may include a user device 110 operated by a user 105, other user device(s) (e.g., user devices 120 and 130), a payment authentication system 140, and a merchant system 160. Each of the foregoing elements may electronically communicate with one another through network 170, which may be one or a combination of public networks (e.g., the Internet), local networks, and/or other networks.

User devices 110, 120 and 130 may each be any suitable computer system. Examples of computer systems that may serve as user devices include mobile computing devices such as smartphones and tablet computers, laptop and desktop computers, and wearable computing devices. User devices 110, 120, and 130 may be different types of computer systems.

User 105, who operates user device 110, may be a person with a financial account, such as a credit or debit card account, that is maintained by an issuer. An issuer may be, for example, a bank or a credit card issuer. The financial account maintained by the issuer for user 105 may have a primary account number (PAN).

User devices 120 and 130 may be operated by user 105 and/or other users. Such other users may include any authorized user who is authorized to use the financial account of user 105 (e.g., for making payment to a merchant). For example, the financial account may be a credit card account of user 105, and either one or both of user devices 120 and 130 may be operated by a family member of user 105 (e.g., a spouse of user 105) who has access to that credit card account.

Payment authentication system 140 may be any suitable computer system. In some embodiments, payment authentication system 140 may have a cloud computing platform with scalable resources for computations and/or data storage, and may run one or more applications on the cloud computing platform to perform the functionalities of the payment authentication system 140. However, it is understood that the present disclosure is not limited to cloud-computing implementations for payment authentication system 140.

In some embodiments, payment authentication system 140 may be part of an issuer system 150. Issuer system 150 may include any computer system operated by the aforementioned issuer that maintains the aforementioned financial account, and/or any computer system operated by an entity that performs payment processing tasks for the issuer. Such an entity may be, for example, an issuer processor, in which case issuer system 150 may be or include a computer system operated by the issuer processor.

It is noted, however, that payment authentication system 140 does not necessarily have to be part of issuer system 150, and may instead be separate from issuer system 150. For example, payment authentication system 140 may be operated by a payment service provider that is independent of any issuer.

The term "payment authentication" is used to indicate that payment authentication system 140 is configured to perform a payment authentication method as described in this disclosure, and is not intended to limit the functionality of payment authentication system 140. For example, payment authentication system 140 may perform functionalities other than payment authentication functionalities. In some embodiments, payment authentication system 140 and issuer system 150 may be regarded as the same computer system. For example, payment authentication system 140 may also be a system that generates tokens and tracks their correspondence to PANs. Accordingly, payment authentication system 140 may also be referred to as a token server, or a token service provider computer system.

In this disclosure, payment authentication performed by payment authentication system 140 may include an aspect of identity verification. Identity verification may pertain to verification of the identity of a customer that is making an online payment to a merchant. Therefore, when payment authentication performed by payment authentication system 140 includes identify verification, payment authentication system 140 may also be referred to as an identity verification system that provides an identity verification service. As will be discussed below in more detail, identity verification may be performed by verifying that a payment using a token was made by a user device that successfully provided a device fingerprint matching a previously stored device fingerprint associated with that token. Identity verification may be provided as a service used by other components of issuer system 150, and/or by computer systems of other financial institutions.

Merchant system 160 may be a computer system operated by a merchant. Merchant system 160 may, for example, execute a server program that services an electronic commerce (e-commerce) application from which user 105 may purchase a product. Such a purchase may involve an online payment using a token as described in this disclosure. The electronic commerce application may be, for example, a website accessible using a web browser executed on user device 110, 120, or 130, or an application installed on user device 110, 120, or 130.

Payment authentication system 140 may include a database 145 and may authenticate payments made using user device 110, 120 or 130 based on information stored in database 145. As shown, database 145 may include datasets 131, 132, and 133 respectively pertaining to different primary account numbers (PANs). In FIG. 1, dataset 131 may pertain to PAN 1, which may be the PAN of the aforementioned financial account of or accessible to user 105. Datasets 132 and 133 may pertain to other PANs, which may include other PANs of user 105 and/or PANs of other users.

Dataset 131 for PAN 1 may include various tokens (e.g., token T1, token T2, token T3, and token T4, as shown in FIG. 1). Each of the tokens in dataset 131 may be a representation of PAN 1. When a token represents PAN 1, a payment made using the token may result in payment from the financial account having PAN 1. A token may be, for example, a virtual card number that can be used in the manner of a credit card on an electronic commerce application serviced by merchant system 160. A virtual card number may have characteristics of a credit card number, such as a length of 13 to 19 digits (which may include, for example, issuer identifier numbers and/or numbers corresponding to financial institutions) and a card verification value (CVV) code. Each of the tokens in dataset 131 may be associated with a corresponding device fingerprint (e.g., device fingerprint DF1, device fingerprint DF2, or device fingerprint DF3, as shown in FIG. 1) and may also be associated with a merchant (e.g., a merchant identified by merchant identifier M1, merchant identifier M2, or merchant identifier M3, as shown in FIG. 1) at which use of the corresponding token is permitted. Such a merchant, at which use of the corresponding token is permitted, may also be referred to as an authorized merchant. When a token is associated with one or more authorized merchants, the token may be unusable for payments to any merchant other than the one or more authorized merchants. A merchant identifier may be, for example, a merchant identification number used in payment processing.

Different tokens may be associated with the same or different device fingerprint, and may be associated with the same or different merchant. The association between a token, a device fingerprint, and a merchant may be stored in any suitable manner. For example, dataset 131 may be a data table in which each row specifies a token representing the respective PAN, a device fingerprint received from a device permitted to use the token, and a merchant identifier corresponding to a merchant.

A device fingerprint, such as device fingerprint DF1, DF2, or DF3, may correspond to a particular user device that generated the respectively associated token. For example, device fingerprints DF1, DF2, and DF3 may be device fingerprints generated by user devices 110, 120 and 130, respectively. As shown in FIG. 1, device fingerprints DF1, DF2, and DF3 are respectively associated with tokens T1, T2, and T3. When a token is associated with a device fingerprint, the token may be used only by a device that successfully provides the corresponding device fingerprint for a payment transaction. For example, token T1, which is associated with device fingerprint DF1, may be used only by a user device that successfully provides device fingerprint DF1. Accordingly, if only user device 110 is capable of generating device fingerprint DF1, then only user device 110 would be capable of using token T1. In this context, the use of a token may be the electronic submission of a token to make a payment.

Each user device 110, 120, 130 may generate its respective device fingerprint and provide that device fingerprint to payment authentication system 140 to be associated with a token. As shown in FIG. 1, a device fingerprint may be generated from a user device attribute and behavioral biometric data. The generation of the device fingerprint is described in more detail below in relation to FIG. 2. In general, behavioral biometric data may also be referred to as behavioral analytics data.

Figure 2:
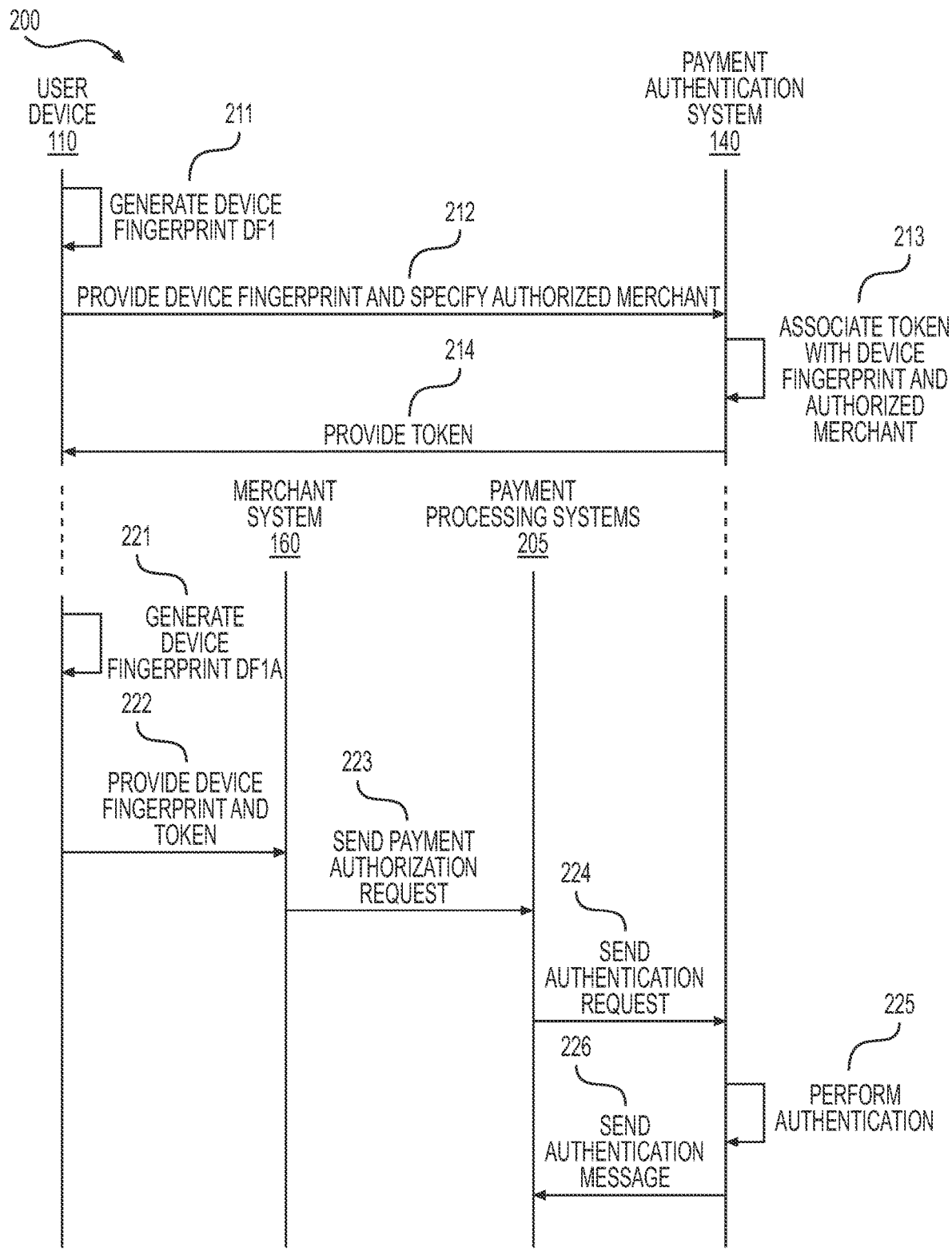
FIG. 2 depicts exemplary data flows in the registration and usage of a device fingerprint, according to one or more embodiments.

FIG. 2 is a diagram depicting data flows 200 in the registration and usage of a device fingerprint. Steps 211 to 214 may be a process of registering a device fingerprint with a token, and may involve user device 110 and payment authentication system 140. Communication of data between user device 110 and payment authentication system 140 may be performed electronically via network 170. While user device 110 serves as an example of a user device, the method of FIG. 2 is also applicable to user devices 120 and 130.

In step 211, user device 110 may generate a device fingerprint DF1. Device fingerprint DF1 may be generated based on a hardware attribute and behavioral biometric data pertaining to user 105's usage of user device 110.

The device attribute may be any attribute associated with user device 110. In some examples, the device attribute may be a serial number or other identifier of user device 110 or of any hardware or software component of user device 110. In some examples, the device attribute may be a serial number or other identifier of user device 110, or a hardware component thereof, such as a CPU, motherboard, network component, or memory component (e.g., hard drive or solid state drive). For example, the device attribute may be a media access control address (MAC) of a network interface controller of user device 110. In this disclosure, an identifier of user device 110 or a hardware component thereof may also be referred to as a hardware identifier. In some examples, the device attribute may be a software parameter, such as a software serial number or registration code of a program. The device attribute may, in general, be a unique identifier or an identifier that is sufficiently unique for purposes of the application. Additionally, it is possible for the device attribute to be a combination of more than one identifiers, including the identifiers described above.

The behavioral biometric data may include any data related to human activity in usage of the user device 110. Behavioral biometric data may be derived from one or more behavioral patterns of user(s) (e.g., user 105) in using user device 110, and may include any suitable data.

Examples of behavioral patterns in using user device 110 include patterns in which user 105 physically interacts with user device 110. For example, if user device 110 is a mobile computing device (which may have sensors such as an accelerometer, a gyroscope, and a magnetometer), the behavioral pattern may describe how user 105 tends to hold a mobile computing device (e.g., at what angle of tilt), and may be discerned based on sensor readings from one or more sensors of the mobile computing device. In some implementations, the pattern of how user 105 tends to hold a mobile computing device may be correlated with an operational state of the mobile computing device (e.g., whether the screen of the mobile computing device is turned on). Additionally or alternatively, the pattern may describe a physical movement that user 105 tends to impart on user device 110 (e.g., when picking up a mobile computing device from a desk) in terms of parameters such as velocity, acceleration, and/or tilt angle, based on readings from sensors of user device 110. Additionally or alternatively, the pattern may describe how user 105 tends to input data into user device 110, or operate input devices (e.g., a keyboard or mouse). Such a pattern may describe a keystroke pattern in inputting characters using a keyboard or touchscreen of user device 110, or a pattern in which a mouse is handled.

Another example of a behavioral pattern in using user device 110 is a travelling pattern of the user device, the travelling pattern reflecting a manner in which user 105 tends to geographically transport the user device 110. Such a pattern may be based on geolocations of the user device 110 over a certain period of time, and such geolocations may be determined based on a geolocation determination feature of user device 110 using, for example, GPS data.

Another example of a behavioral pattern in using user device 110 is a pattern in which the user uses one or more software applications of the user device. Such a pattern may pertain to any software feature of user device 110. For example, the browsing history of user 105 in using a web browser of user device 110 may provide the basis for behavioral biometric data, which may describe the frequency at which a user visits a certain website.

User device 110 may execute a process that generates the behavioral biometric data based on data describing one or more behavioral patterns. Such data describing one or more behavioral patterns may be automatically recorded by user device 110. For example, if user device 110 is a mobile computing device with the aforementioned sensors, user device 110 may automatically record readings from such sensors, and such readings over a period of a sufficient length of time may be used to generate behavioral biometric data pertaining to a pattern in which user 105 physically interacts with user device 110, as described above.

Device fingerprint DF1 may be generated based on a hardware attribute and behavioral biometric data pertaining to user 105's usage of user device 110, in which case device fingerprint DF1 may be said to be derived from the hardware attribute and the behavioral biometric data. In some embodiments, the device fingerprint DF1 may include the hardware attribute and the behavioral biometric data in a format such that both the hardware attribute and the behavioral biometric data are discernable from the device fingerprint DF1. For example, the device fingerprint DF1 may be a composite file that includes the hardware attribute and the behavioral biometric data in an unencrypted plain text format, an encrypted (but decryptable) format, or an encoded (but decodable) format. In some embodiments, device fingerprint DF1 may be generated as a function of the hardware attribute and the behavioral biometric data such that the hardware attribute and the behavioral biometric data are not explicitly recoverable from the device fingerprint DF1. For example, the device fingerprint DF1 may be generated as a hash of the hardware attribute and the behavioral biometric data (e.g., as a hash of a concatenation of the hardware attribute and the behavioral biometric data).

The behavioral biometric data may be reproducible such that when the user 105 attempts to generate a device fingerprint using the same procedure, device fingerprint DF1 previously provided to payment authentication system 140 can be reproduced identically or to a sufficient degree of similarity, even if user 105's usage of the user device 110 has somewhat changed as a result of variations in the usage of user device 110. Therefore, in some embodiments, the behavioral biometric data may include behavioral biometric parameters whose values remain constant despite the variations of the same user in using user device 110. Alternatively or additionally, the values of the behavioral biometric parameters may vary as a result of the variations, but still be capable of being matched with the originally registered values of the behavioral biometric parameters to a sufficient degree of similarity.

It is noted that a device fingerprint that is derived from a hardware attribute and behavioral biometric data may be derived from more than one hardware attribute (e.g., multiple hardware attributes as described above) and/or more than one type of behavioral biometric data. Additionally, while the behavioral biometric data has generally been described as being attributed to user 105, the behavioral biometric data does not need to be specific to user 105, but may be behavioral biometric data reflective of all users that have used user device 110. When generating the behavioral biometric data based on data describing a behavioral pattern as described above, user device 110 does not need to determine whether the data describing the behavioral pattern is attributed to a specific user.

In step 212, user device 110 may provide the generated device fingerprint DF1 and specify an authorized merchant. For example, user device 110 may transmit the generated device fingerprint DF1 and an identification of the authorized merchant to payment authentication system 140. The generated device fingerprint DF1 and the identification of the authorized merchant may be transmitted separately or transmitted together. In some embodiments, user device 110 may specify a plurality of merchant identifiers, each corresponding to a respective authorized merchant.

In example dataset 131 shown in FIG. 1, the authorized merchant may be a merchant having merchant identifier M1 and may be the merchant operating merchant system 160. The identification of the specified merchant may be in the form of any message that is indicative of the merchant identifier M1 that is to be stored in dataset 131.

In some embodiments, user device 110 may transmit a token request to payment authentication system 140. The token request may be recognized by the payment authentication system 140 as a request to generate a token (e.g., token T1) that is to be associated with a PAN (e.g., PAN 1) of user 105. The token request may include device fingerprint DF1, and may further include the aforementioned identification of the specified merchant.

In step 213, payment authentication system 140 may associate a token with device fingerprint DF1 and with the authorized merchant. Step 213 may be triggered by receipt of the token request described above. In step 213, payment authentication system 140 may generate token T1 and create the first row of dataset 131 shown in FIG. 1, which may be a database table row. Token T1 may be generated using any suitable method. As described above, in some embodiments, token T1 may be a virtual card number that resembles a credit card number.

In step 214, payment authentication system 140 may provide (e.g., transmit) the generated token T1 to user device 110. User device 110, upon receiving token T1 from payment authentication system 140, may then store token T1 in a memory of user device 110 and/or display token T1 to user 105 on a display screen of user device 110.

The process of steps 211 to 214 may also be performed for other user devices, such as user devices 120 and 130. For example, user 105 (or other user) of user device 120 may operate user device 120 to generate device fingerprint DF2, and request payment authentication system 140 to associate device fingerprint DF2 and merchant identifier M2 with one token (e.g., a token generated as token T2), and to associate device fingerprint DF2 and merchant identifier M3 with another token (e.g., a token generated as token T4). Additionally, user 105 (or other user) of user device 130 may operate user device 130 to generate device fingerprint DF3, and request payment authentication to associate device fingerprint DF3 and merchant identifier M2 with a token (e.g., a token generated as token T3).

Steps 221 to 226 may be a process of using device fingerprint DF1 for a payment that is a part of a transaction (e.g., a purchase of a product) between a merchant and a customer. The process may additionally involve merchant system 160 and payment processing systems 205.

In step 221, user device 110 may generate device fingerprint DF1A. Step 221 may be performed in the manner of step 211, using the same fingerprint generation process as described for step 211. In this disclosure, the device fingerprint generated in step 221 is designed as fingerprint "DF1A" to indicate that it is generated subsequent to the generation of the original device fingerprint DF1 that is stored in database 145 of payment authentication system 140. Later in the process, payment authentication system 140 may determine whether this subsequently generated device fingerprint DF1A matches (e.g., identically and/or to a sufficient degree) the previously generated device fingerprint DF1 that was provided to and stored in payment authentication system 140. A match between device fingerprint DF1A and fingerprint DF1 may be a condition for authentication of the transaction.

Step 221 may be performed in any suitable context, and may be triggered by any suitable trigger condition. In some embodiments, user device 110 may detect a user operation identifying token T1 for submission to merchant system 160. In some examples, user device 110 may display a graphical user interface of an electronic commerce application serviced by merchant system 160, and the graphical user interface may permit user 105 to input or select a credit card number. A user operation identifying token T1 for submission to merchant system 160 may be, for example, an interaction with a credit card number input field of the graphical user interface, or the selection of a token from a list of tokens and/or credit card numbers.

In additional examples, user device 110 may detect user 105's interaction with an input field (or other interactive element) permitting user 105 to input or otherwise identify a credit card number. Upon detecting the interaction, user device 110 may prompt the user 105 to make a selection of a payment option from a list of tokens, credit card numbers, and/or other forms of payment options, and the user may select token T1 from that list of payment options, so as to identify the token T1 for submission to merchant system 160. Additionally or alternatively, token T1 may be set to be the default payment option, and user device 110 may prompt the user 105 to confirm the identification of token T1 for use with the merchant system 160.

The aforementioned electronic commerce application may be, for example, a web application (e.g., a website with electronic commerce functionality) that is displayed in a web browser of user device 110. Merchant system 160 may service the web application by transmitting the web application to the user device 110 for execution in the web browser. In such examples, the web browser of user device 110 may have a web browser extension that is configured to detect the user operation identifying token T1 for submission to merchant system 160. The web browser extension may also be configured to generate device fingerprints in accordance with steps 211 and 221.

However, it is also possible for the e-commerce application to be an application that is installed on user device 110, such as a merchant-specific mobile app. In such examples, merchant system 160 may provide data for the application, such as a list of products that may be purchased and their provides. In such examples, the application may be configured to generate the device fingerprint DF1, or may utilize another application or application component (e.g., a software development kit) installed on user device 110 that is configured to generate device fingerprints in accordance with steps 211 and 221.

User device 110 may generate device fingerprint DF1A at any suitable point in time after determining that a context for token use exists. For example, when a context for token use is detected, user device 110 may prompt user 105 to select a token (e.g., a token from among tokens T1, T2, T3, and T4) for use with the merchant operating merchant system 160. Upon selection of a token (e.g., token T1), user device 110 may generate device fingerprint DF1A.

In step 222, user device 110 may provide device fingerprint DF1A, along with token T1, to merchant system 160. In step 222, the device fingerprint DF1A and token T1 may be provided via any method and/or protocol, such as Hypertext Transfer Protocol (HTTP) or Hypertext Transfer Protocol Secure (HTTPS), and may be provided through network 170. Device fingerprint DF1A and/or token T1 may be transmitted to merchant system 160 as part of a request to complete the transaction. The transaction may be the purchase of a product from the merchant, in which case the request may be referred to as a purchase request. User device 110 may submit token T1 as part of the purchase request to indicate that user 105 will use token T1 to make a payment to the merchant for purposes of the purchase. In this disclosure, the term "product" may encompass both goods and services.

In step 223, merchant system 160 may send a payment authorization request to payment processing systems 205. The payment authorization request may include, or otherwise be indicative of, the device fingerprint DF1A and token T1 so that payment processing systems 205 may forward device fingerprint DF1A and token T1 to payment authentication system 140. The payment authorization request may additionally describe the transaction between user 105 and the merchant. In some embodiments, merchant system 110 may encrypt the device fingerprint DF1A and/or token T1, and transmit the device fingerprint DF1A and/or token T1 to payment processing systems 205 in encrypted form. The payment authorization request may be transmitted to payment processing systems 205 via network 170. In the context of step 223, the merchant that operates merchant system 160 may be referred to as a requesting merchant.

Payment processing systems 205 may include any one or combination of computer systems that handle processing of payments for the benefit of a merchant. For example, payment processing systems 205 may include an acquirer system and may further include computer systems associated with other entities, such as a payment processor and/or card network. It is noted that these possible components of the payment processing systems 205 need not be mutually exclusive. It is also possible for payment processing systems 205 to include issuer system 150 or part of issuer system 150. For example, the issuer that operates issuer system 150 may serve as an acquire for the merchant that operates merchant system 110. In this disclosure, an "acquirer system" may include a computer system of any entity, such as an acquiring processor, that assists the acquirer in payment processing.

In step 224, payment processing systems 205 may send an authentication request to payment authentication system 140. The authentication request may include device fingerprint DF1A and token T1 (either or both of which may be provided in encrypted form). The authentication request may be understood by payment authentication system 140 as a request to perform authentication. If payment authentication system 140 is, or is part of, issuer system 150 as described above, step 224 may include a transfer of data to issuer system 150 from a computer system represented by payment processing systems 205 that is different from issuer system 150.

The authentication request may include additional information pertaining to the purchase transaction, such as an identifier of the merchant that requested authorization.

In step 225, payment authentication system may perform authentication 225. Step 225 may be performed in response to receiving the authentication request sent in step 224. In step 225, payment authentication system 140 may verify whether condition(s) for authentication of the payment are satisfied. The condition(s) for authentication may include a match between device fingerprint DF1A provided by the authentication request (and initially transmitted from user device 110 to merchant system 160 in step 222) and a reference device fingerprint stored in payment authentication system. Based on token T1 received with the authentication request, payment authentication system 140 may determine that the corresponding device fingerprint is DF1, which is the device fingerprint to be used as the reference device fingerprint. Payment authentication system 140 may then determine whether there is a match between device fingerprint DF1A and DF1.

If device fingerprint DF1A and device fingerprint DF1 match, payment authentication system 140 may determine that the payment originated from a user device that has permission to use the token. Alternatively, if device fingerprint DF1A and device fingerprint DF1 do not match, then payment authentication system 140 may determine that the payment originated from a user device that does not have permission to use the token.

Since device fingerprint DF1A and device fingerprint DF1 may have been generated using the same fingerprint generation process, the two fingerprints may be identical to one another if the hardware attribute and the behavioral biometric data used to generate the fingerprints have not changed. Alternatively, if the data describing the behavioral pattern(s) that is used to generate behavioral biometric data has changed in between step 211 and step 221, so as to result in a device fingerprint DF1A that is somewhat different from reference device fingerprint DF1, payment authentication system 140 may still find a match if the two are sufficiently similar, based on a suitable criteria for sufficient similarity. In determining sufficient similarity, payment authentication system 140 may perform a comparison and determine a result based on any suitable criteria for sufficient similarity.

The determination of whether device fingerprint DF1A and device fingerprint DF1 match may also be referred to as an identity verification process. The authentication request sent in step 224, which results in the identity verification process may also be referred to as an identity verification request. In addition to a match between device fingerprint DF1A and device fingerprint DF1, the condition(s) for authentication may further include a match between a merchant identifier indicated by the authentication request and merchant identifier M1 associated with token T1. If token T1 is associated with a plurality of merchant identifiers respectively corresponding to a plurality of authorized merchants, payment authentication system 140 may verify that the merchant identifier indicated by the authentication request matches merchant identifier M1, as a required condition for payment authentication. If the condition(s) for authentication are satisfied, payment authentication system 140 may generate an authentication message indicating that authentication of the payment was successful.

It is noted that authentication of a payment may also be referred to as an authentication of the transaction of which the payment is a part, when permitted by context. Therefore, where context permits, the condition(s) for payment authentication may also be referred to as the condition(s) for transaction authentication.

In step 226, payment authentication system may send the generated authentication message to payment processing systems 205. The authentication message may also be regarded as an identity verification message.

The generated authentication message may be sent to the computer system that sent the authentication request. For example, if an acquirer system sent the authentication request in step 224, the authentication message may be sent to the acquirer system in step 226. As another example, if payment authentication system 140 is part of issuer system 150, and the authentication request of step 224 was sent by another component of the issuer system 150, then the authentication message may be sent to that other component of the issuer system 150. In this example, the component requesting authentication may be a software process that communicates with the process performing the functionalities described for the payment authentication system 140.

In some examples, the authentication message sent to payment processing systems 205 may indicate the PAN (e.g., PAN 1) represented by the token T1 used for payment. Upon receiving the authentication message, payment processing systems 205 may then proceed to perform any remaining processing steps that are needed for the payment to be processed. These remaining processing steps may result in a transfer of funds from the financial account of user 105 to a financial account of the merchant. Furthermore, payment authentication system 140 may also send a notification to user device 110 indicating that authentication of the payment was successful.

If the condition(s) for authentication of the payment are not satisfied, or not all satisfied, then payment authentication system 140 may instead generate and send to payment processing systems 205 an authentication failure message indicating that authentication of the payment failed. Payment processing systems 205 may recognize the authentication failure message as a trigger to deny the payment transaction requested by the payment authorization request. For example, payment processing systems 205 may return a payment denied message to merchant system 160.

Figure 3:
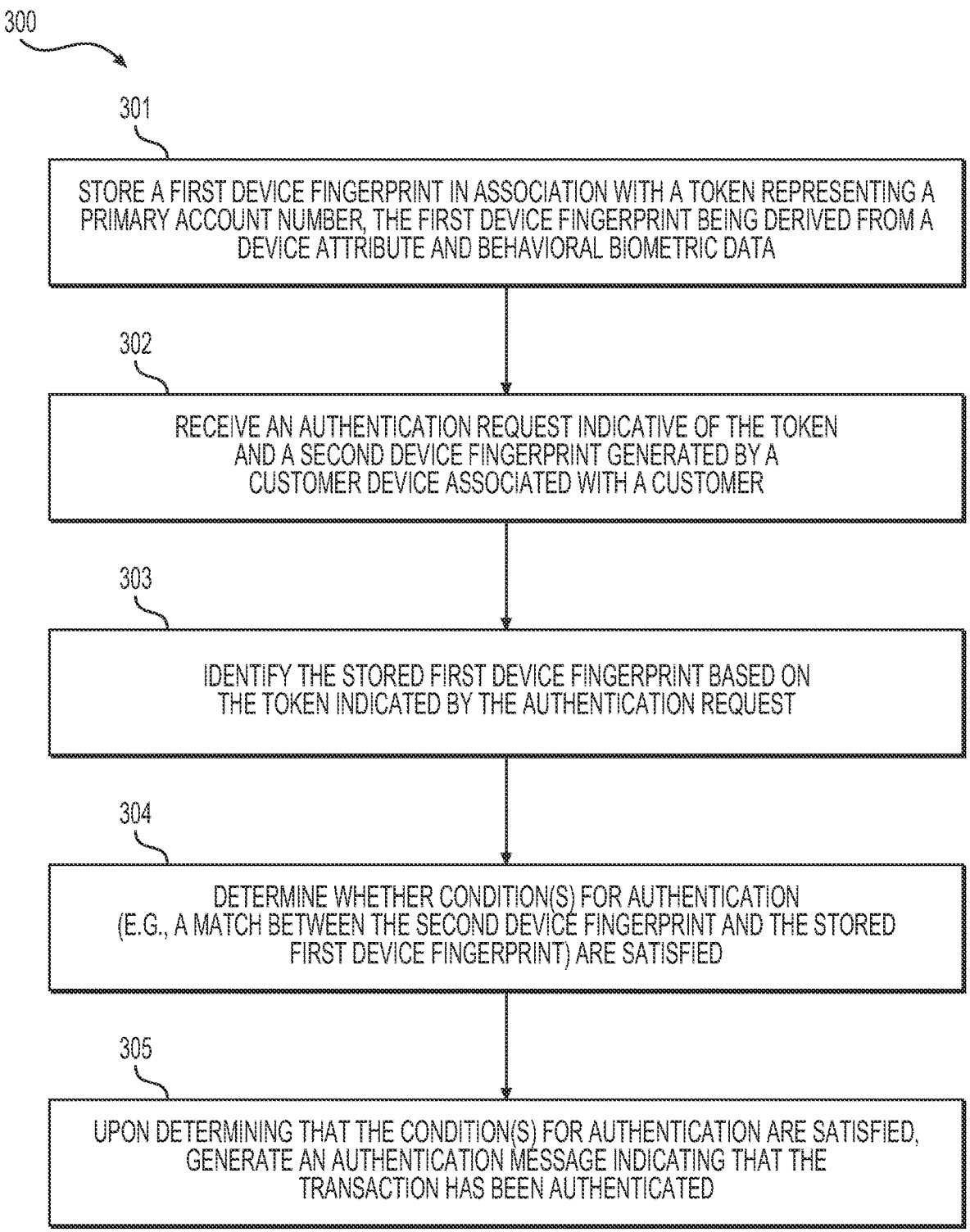
FIG. 3 depicts an exemplary method for payment authentication, according to one or more embodiments

FIG. 3 depicts a method 300 for payment authentication according to one or more embodiments. The method may be performed by any suitable computer system, such as payment authentication system 140 described above.

Step 301 may include storing a first device fingerprint DF1 in association with a token T1 representing a primary account number (e.g., PAN 1). As described above, device fingerprint DF1 may be derived from a device attribute and behavioral biometric data, and the behavioral biometric data may be derived from a behavioral pattern of a user 105 in using a user device 110. The first device fingerprint DF1 may be generated by user device 110 in accordance with step 211 described above. The first device fingerprint DF1, the token T1, and PAN 1 may be associated with one another in the manner of dataset 131 described above.

Step 302 may include receiving an authentication request indicative of the token T1 and a second device fingerprint generated by a customer device associated with a customer. In this context, the second device fingerprint may be device fingerprint DFA1 generated in accordance with step 221, and the customer may be a customer of a merchant with which the customer has entered into a transaction. The authentication request may be associated with this transaction and may be generated and transmitted from payment processing systems 205 as described in connection with step 224. The customer in step 302 may be user 105, and may be verified to be user 105 by payment authentication system 140.

Step 303 may include identifying the stored first device fingerprint DF1 based on the token T1 indicated by the authentication request. For example, in dataset 131, device fingerprint DF1 may be determined to be the device fingerprint corresponding to token T1.

Step 304 may include determining whether one or more conditions for authentication are satisfied. Step 304 may be performed in accordance with step 225 described above. For example, the condition(s) for authentication may include a match between the second device fingerprint DF1A and the stored first device fingerprint DF1, wherein a match may be an exact match or a sufficient match based on a threshold degree of similarity between the second device fingerprint DF1A and the stored first device fingerprint DF1. In some embodiments, the condition(s) for authentication may further include a match between an identifier of an authorized merchant and an identifier of the merchant that is a party of the transaction, as described above.

Step 305 may include generating an authentication message indicating that the transaction has been authenticated. Step 305 may be performed upon determining that the condition(s) for authentication are satisfied. Afterwards, the authentication message may be transmitted to another computer system, such as to a computer system represented by payment processing systems 205, as described above in connection with step 226.

Figure 4:
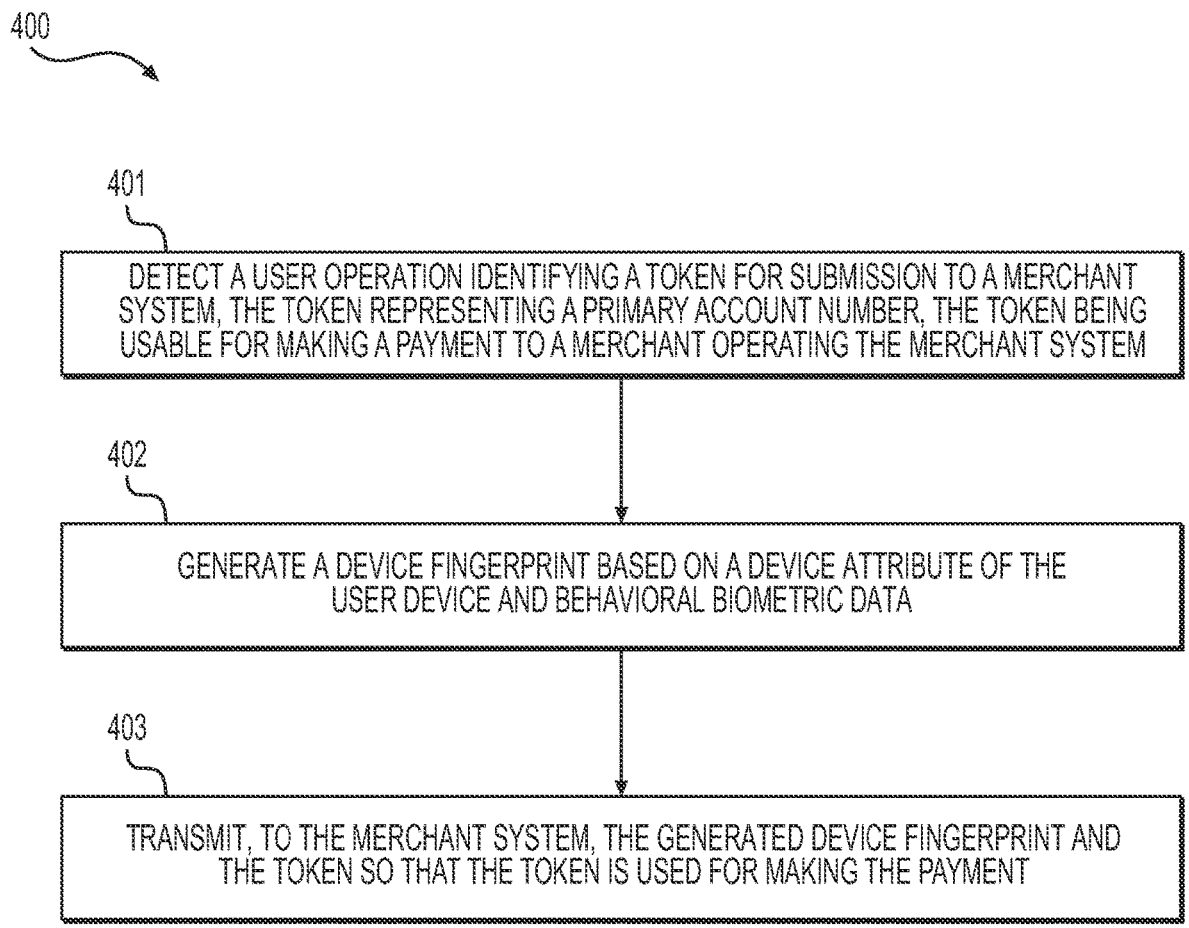
FIG. 4 depicts an exemplary method for providing data for payment authentication, according to one or more embodiments.

FIG. 4 illustrates a method 400 for providing data for payment authentication. The method may be performed by any suitable computer system, such as user device 110 described above.

Step 401 may include detecting a user operation identifying a token (e.g., token T1) for submission to a merchant system 160. Token T1 may represent a primary account number, and may be usable for a payment to the merchant operating the merchant system 160. The user operation identifying the token T1 may be as described above in connection step 211.

Step 402 may include generating a device fingerprint based on a device attribute of the user device (e.g., user device 110) and behavioral biometric data. Step 402 may be performed in the manner of step 221 described above.

Step 403 may include transmitting, to the merchant system, the generated device fingerprint and the token so that the token is used for making the payment. Step 403 may be performed in the manner of step 222 described above.

According to the techniques described above, payment authentication system 140 may determine whether a payment using a token was originated from a user device having authorization to use a token. Therefore, payment authentication system 140 may approve payments from authorized devices and deny payments from unauthorized devices, so as to prevent unauthorized usage of a token by a device that does not successfully generate a matching device fingerprint. Moreover, payment authentication system 140 may approve payments made using a token only when the payment is directed to an authorized merchant. Accordingly, the techniques of the present disclosure may improve financial technology by minimizing the risk of unauthorized usage of tokens.

In general, any process discussed in this disclosure that is understood to be computer-implementable, such as the processes shown in FIG. 2 and the methods described in connection with FIGS. 3-4, may be performed by one or more processors of a computer system, such as the exemplary computer systems described in connection with FIGS. 2-4. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as user devices (e.g., user devices 110, 120, and/or 130), payment authentication system 140, issuer system 150, merchant system 160, and/or any system represented by payment processing systems 205, may include one or more computing devices. If the one or more processors of the computer system is implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 5:
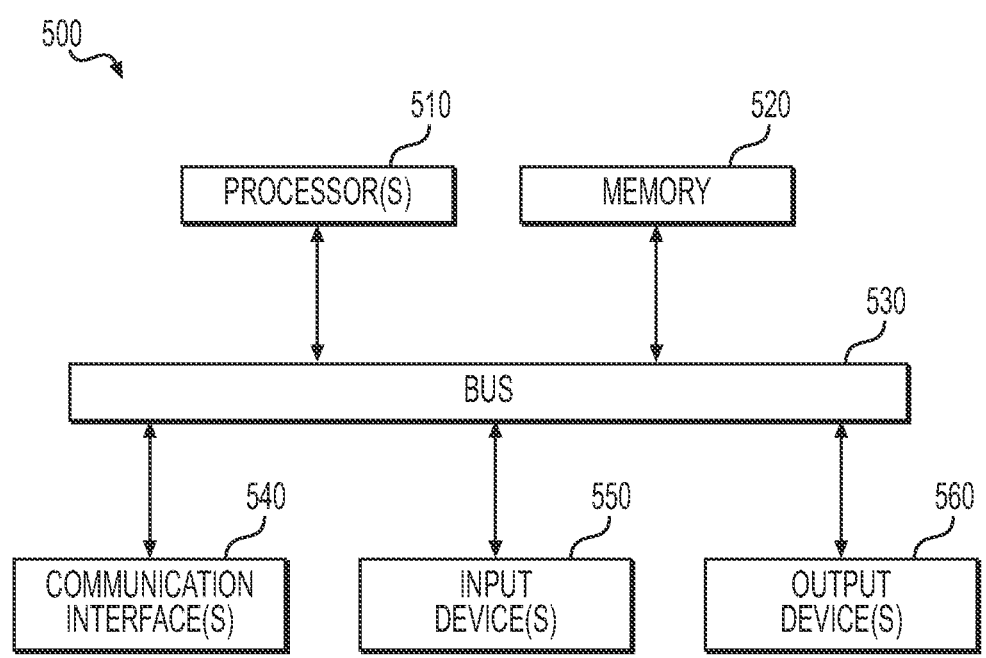
FIG. 5 depicts an exemplary computing device, according to one or more embodiments.

FIG. 5 illustrates an example of a computing device 500 of a computer system. The computing device 500 may include processor(s) 510 (e.g., CPU, GPU, or other processing unit), a memory 520, and communication interface(s) 540 (e.g., a network interface) to communicate with other devices. Memory 520 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 520. The computing device 500 may, in some embodiments, further include input device(s) 550 (e.g., a keyboard, mouse, or touchscreen) and output device(s) 560 (e.g., a display, printer). The aforementioned elements of the computing device 500 may be connected to one another through a bus 530, which represents one or more busses. In some embodiments, the processor(s) 510 of the computing device 500 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, configure and/or cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A method for payment authentication implemented by a payment authentication system, the method comprising:
   receiving, from a user device of a user associated with an account number, a token request that includes a first device fingerprint generated by the user device;
   generating a token representing the account number;
   storing the first device fingerprint in association with the token;
   providing the token to the user device;
   receiving, from a payment processing system, an authentication request that includes the token and a second device fingerprint generated by a customer device of a customer using the token to make a payment to a merchant to complete a transaction;
   determining whether the second device fingerprint and the first device fingerprint stored in association with the token match, wherein determining a match indicates the customer device is the user device authorized to use the token to make the payment; and
   generating and transmitting, to the payment processing system, an authentication message responsive to the authentication request based on the determination, wherein:
   in response to determining the match, the authentication message indicates that the transaction is authenticated so that the token is used to make the payment to the merchant, or
   in response to determining no match, the authentication message indicates that the transaction is denied.

2. The method of claim 1, wherein the first device fingerprint generated by the user device is based on one or more device attributes of the user device and behavioral biometric data of the user.

3. The method of claim 2, wherein determining the second device fingerprint and the first device fingerprint stored in association with the token match comprises:
   determining the second device fingerprint is indicative of the one or more device attributes of the first device fingerprint; and
   determining the second device fingerprint is indicative of behavioral biometric data having at least a threshold degree of similarity with the behavioral biometric data of the first device fingerprint.

4. The method of claim 1, wherein the token request further includes a first merchant identifier for an authorized merchant that is stored in association with the token.

5. The method of claim 4, wherein the authentication request further includes a second merchant identifier of the merchant, and the method further comprises:
   determining whether the second merchant identifier and the first merchant identifier match, wherein determining a match indicates the merchant is the authorized merchant for whom the token is usable to make the payment, and wherein the authentication message is further generated based on the determination.

6. The method of claim 1, wherein the authentication request includes encrypted data derived from the token and the second device fingerprint.

7. The method of claim 1, further comprising:
   transmitting a notification indicating that the transaction is authenticated or denied to the user device.

8. The method of claim 1, wherein the token is a virtual card number.

9. A method for payment authentication implemented by a user device, the method comprising:
   generating a first device fingerprint;
   generating a request for a token to represent an account number of a user associated with the user device, wherein the request includes the first device fingerprint;
   transmitting the request to a payment authentication system, wherein the payment authentication system generates the token responsive to the request and stores the first device fingerprint in association with the token;
   receiving the token from the payment authentication system; and
   in response to detecting an input to make a payment to a merchant using the token:
   generating a second device fingerprint that is the same as the first device fingerprint; and
   providing the token with the second device fingerprint to the payment authentication system, wherein the payment authentication system authenticates the use of the token for the payment based on the second device fingerprint matching the first device fingerprint stored in association with the token, and wherein the token is used to make the payment to the merchant based on the authentication.

10. The method of claim 9, wherein generating each of the first device fingerprint and the second device fingerprint comprises:
generating the respective device fingerprint based on one or more device attributes of the user device and behavioral biometric data of the user.

11. The method of claim 10, further comprising:
deriving the behavioral biometric data of the user from one or more recorded behavioral patterns of the user when using the user device.

12. The method of claim 11, wherein the one or more recorded behavioral patterns include one or more of:
a pattern in which the user holds or transports the user device;
a traveling pattern of the user device;
a pattern in which the user uses one or more software applications of the user device; or
a web browsing history.

13. The method of claim 10, wherein the first device fingerprint is a composite file that includes the one or more device attributes and the behavioral biometric data.

14. The method of claim 10, wherein the first device fingerprint is generated as a function of the one or more device attributes and the behavioral biometric data.

15. The method of claim 10, wherein the payment authentication system determines the second device fingerprint matches the first device fingerprint stored in association with the token based on the second device fingerprint being indicative of the one or more device attributes of the first device fingerprint, and of behavioral biometric data having at least a threshold degree of similarity with the behavioral biometric data of the first device fingerprint.

16. The method of claim 9, wherein the request for the token further includes a first merchant identifier of an authorized merchant, and the first merchant identifier is stored in associated with the token.

17. The method of claim 16, further comprising:
receiving a second merchant identifier of the merchant to receive the payment; and
providing the second merchant identifier to the payment authentication system, wherein the payment authentication system determines the second merchant identifier matches the first merchant identifier stored, the match indicating the merchant is the authorized merchant for whom the token is usable to make the payment.

18. A method for payment authentication implemented by a payment processing system, the method comprising:
receiving, from a merchant system associated with a merchant, a token provided to the merchant system for use as payment to complete a transaction between the merchant and a user, and a device fingerprint of a user device utilized by the user to perform the transaction, the token generated by a payment authentication system and representing an account number of the user;
generating an authentication request including at least the token and the device fingerprint;
transmitting the authentication request to the payment authentication system, wherein the payment authentication system determines the device fingerprint included in the authentication request matches a device fingerprint that is stored in association with the token by the payment authentication system, the match indicating the user device is authorized to use the token to make the payment;
receiving, from the payment authentication system, an authentication message responsive to the authentication request indicating the use of the token to make the payment is authenticated; and
using the token to make the payment to the merchant.

19. The method of claim 18, wherein the authentication message includes the account number to enable use of the token to make the payment.

20. The method of claim 18, wherein the payment processing system implementing the method is associated with an issuer of the account number or a payment processor of the issuer.

* * * * *